United States Patent [19]

Satomura

[11] Patent Number: 5,768,234
[45] Date of Patent: Jun. 16, 1998

[54] SYNCHRONIZING MARK DETECTING APPARATUS AND METHOD AND INFORMATION REPRODUCING APPARATUS AND METHOD

[75] Inventor: Seiichirou Satomura, Kawasaki, Japan

[73] Assignee: Canon Kabushiki Kaisha, Tokyo, Japan

[21] Appl. No.: 295,467

[22] Filed: Aug. 25, 1994

[30] Foreign Application Priority Data

Aug. 27, 1993 [JP] Japan .................................. 5-235816

[51] Int. Cl.$^6$ ................................................ G11B 7/00
[52] U.S. Cl. ........................... 369/59; 369/47; 369/50; 369/58; 369/48
[58] Field of Search ........................ 369/59, 47, 48, 369/49, 50, 53, 54, 58, 60, 32, 124; 360/48, 51, 77.08

[56] References Cited

U.S. PATENT DOCUMENTS

| | | | |
|---|---|---|---|
| 4,835,759 | 5/1989 | Saito et al. | 369/59 |
| 4,866,692 | 9/1989 | Saito et al. | 369/59 |
| 5,182,740 | 1/1993 | Mizokami et al. | 369/47 |

FOREIGN PATENT DOCUMENTS

| | | |
|---|---|---|
| 0461912 | 12/1991 | European Pat. Off. . |
| 0484555 | 5/1992 | European Pat. Off. . |
| 0517483 | 12/1992 | European Pat. Off. . |
| 0549153 | 6/1993 | European Pat. Off. . |

*Primary Examiner*—Georgia Y. Epps
*Assistant Examiner*—Muhammad N. Edun
*Attorney, Agent, or Firm*—Fitzpatrick, Cella Harper & Scinto

[57] ABSTRACT

A synchronizing pattern detecting apparatus includes a pattern matching device, a pulse generating device, a delay device and a determination device. The pattern matching device samples synchronizing patterns with an asynchronous clock to determine whether the synchronizing patterns match with predetermined patterns. The pulse generating device generates a plurality of pulse signals having predetermined widths in accordance with the synchronizing patterns when the pattern matching device determines successful pattern matching. The delay device delays the plurality of pulse signals output from the pulse generating device to substantially match the timings of the pulse signals with each other. The determination device synthesizes output signals from the delay device to determine a degree of matching of the synchronizing patterns from a synthesis result.

8 Claims, 13 Drawing Sheets

FIG. 3
*PRIOR ART*
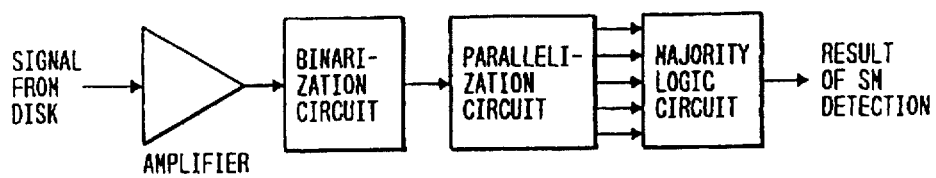
FIG. 4A *PRIOR ART*
FIG. 4B *PRIOR ART*
FIG. 4C *PRIOR ART*
FIG. 4D *PRIOR ART*
FIG. 4E *PRIOR ART*
FIG. 4F *PRIOR ART*
FIG. 4G *PRIOR ART*
FIG. 4H *PRIOR ART*
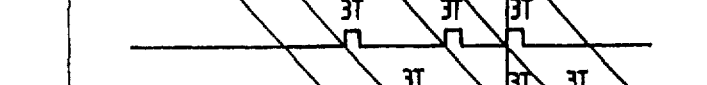
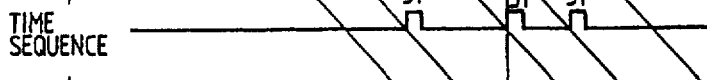
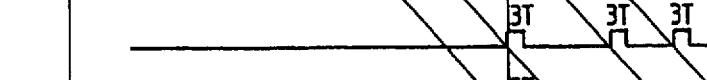
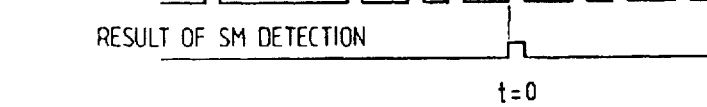

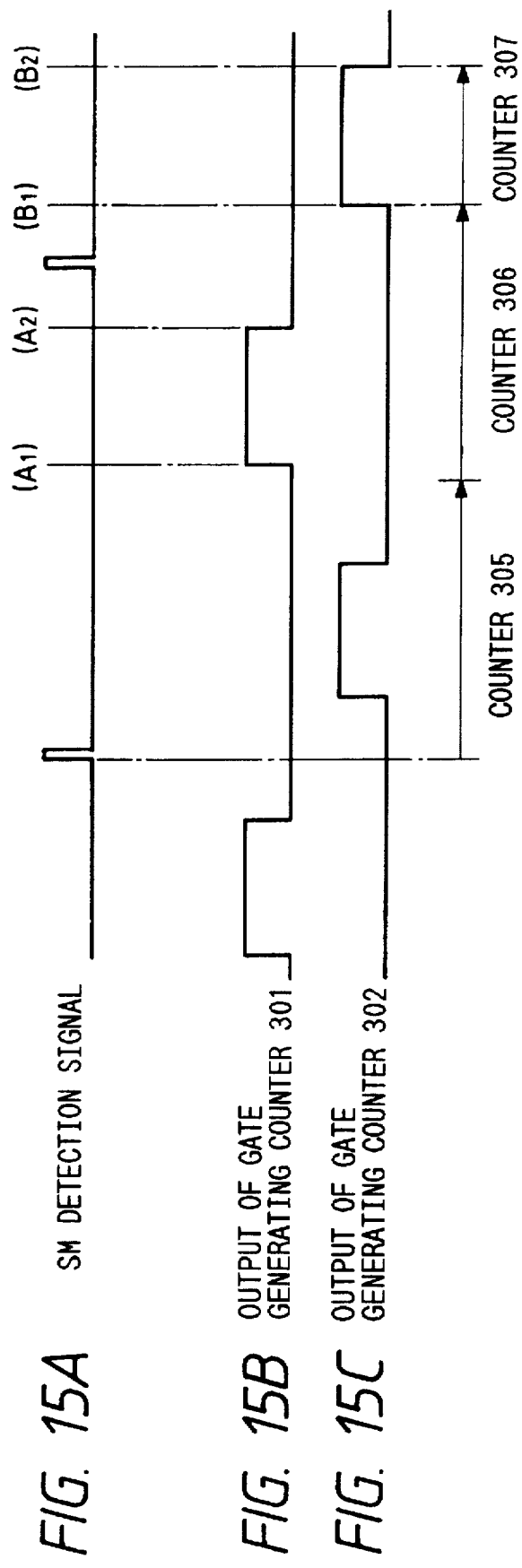

SYNCHRONIZING MARK DETECTING APPARATUS AND METHOD AND INFORMATION REPRODUCING APPARATUS AND METHOD

BACKGROUND OF THE INVENTION

1. Field of the Invention

The present invention relates to a synchronizing mark detecting apparatus for detecting a synchronizing mark of a recording medium and an information reproducing apparatus for reproducing digital information of a recording medium.

2. Related Background Art

FIG. 1 is a view showing the sector format of a 130-mm or 90-mm rewritable optical disk complying with the ISO standards. FIG. 2 is a view showing an example of the patterns of the start sector mark (SM) of this sector format. The recording area of an optical disk is divided into a plurality of sectors, as shown in FIG. 1. A predetermined synchronizing mark (sector mark) is provided at the start of each sector to recognize the start of the sector. The sector mark patterns in FIG. 2 are well known by the ISO standards or the like, and a detailed description thereof will be omitted. Such a sector mark indicates the start of the sector. If the sector mark cannot be detected, the recording, erasing, reproducing, or seek operation cannot be performed in this sector. For this reason, the sector mark must be always accurately detected.

FIG. 3 is a circuit diagram showing a sector mark detection circuit described in the technical report of the ISO standards of a 130-mm write once optical disk. FIG. 4 is a view showing the operation of the sector mark detection circuit. This sector mark detecting method is simple and reliable and known as the most generally used method of sector mark detection. This method will be simply described below. 5 T marks and 3 T marks are detected at five positions in a reproduction signal read from the optical disk. The detection results are added. If marks are detected at three or more of the five positions, the pattern is recognized as a sector mark in accordance with the majority logic, and an SM detection signal is output.

The values of the sector mark patterns in FIGS. 4A–4H are ½ those of the patterns shown in FIG. 2. This is because the length of T in FIGS. 4A–4H is twice that in FIG. 2. That is, matching of the sector mark patterns in FIGS. 4A–4H is performed at a period twice that of the normal recording clock. For this reason, some margin can be ensured with respect to a frequency error and a phase error, as will be described later.

As a method of increasing the recording density of a disk-like recording medium, the ZCAV (Zoned Constant Angular Velocity) method is known. In the ZCAV method, the recording area of a recording disk is radially divided into a plurality of zones, and data is recorded at the same recording frequency in one zone. In an outer zone, information is recorded or reproduced at a higher frequency such that the recording density is almost constant in the inner and outer zones of the recording disk. FIG. 5 is a block diagram showing an information reproducing apparatus using the ZCAV method.

Referring to FIG. 5, a recording disk 101 is a disk having the ZCAV format. When information recorded on this disk is to be reproduced, a controller 111 supplies a command designating a certain zone of the recording disk 101 from which data is to be reproduced, to a drive/servo means 112 and a synthesizer 105. The drive/servo means 112 performs a seek operation of a reproducing head (not shown) to the track of the designated zone. At the same time, the clock frequency of the synthesizer 105 is switched to a frequency corresponding to the designated zone. To perform a seek operation of the reproducing head to the target track, information at the header of each sector as shown in FIG. 1 is read out to be collated with that at the target track or sector, thereby moving the reproducing head to the target position.

More specifically, an SM detection circuit 107 detects the sector mark in FIG. 2. An AM/SYNC/RESYNC detection circuit 109 detects an AM, SYNC, and the like with reference to the SM detection signal. In response to a clock from the synthesizer 105, a data separator 106 generates a synchronizing clock from binary reproduction data from a binarization circuit 104. The binary reproduction data is synchronized with the clock. The synchronized data is decoded by a decoding circuit 108, and address information is reproduced. The obtained address information is supplied to the controller 111 and the drive/servo means 112. The drive/servo means 112 compares and collates the received address with the target address to set the read position of the reproducing head at the target address.

Upon completion of the seek operation, data at the target address of the recording disk 101, i.e., data in the data area (recording field) in FIG. 1 is reproduced. To reproduce the data, a signal detection means 102 detects a reproduction signal. The reproduction signal is amplified by an amplifier 103 and binarized by the binarization circuit 104. The obtained binary reproduction data is sent to the data separator 106. The data separator 106 detects the start position of the data area with reference to the SM detection signal from the SM detection circuit 107. Upon reception of a clock from the synthesizer 105, the data separator 106 generates a synchronizing clock from the binary reproduction data. The binary reproduction data is synchronized with the clock. The synchronized data is decoded by the decoding circuit 108, and an error correcting code is added by an error correcting circuit 110, thereby generating reproduction data.

In the information reproducing apparatus shown in FIG. 5, the clock frequency of the synthesizer is switched at each zone boundary of the recording disk. At this time, the data separator operates normally in many cases even when a clock frequency error of several percent occurs. However, the SM detection circuit samples a signal with the asynchronous clock of the synthesizer. For this reason, the SM cannot be accurately detected if a clock frequency error of several percent occurs. For example, in FIGS. 4A–4H, to synthesize the detection result of 5 T at the left end of the SM and the detection result of 5 T at the right end, a 30 T delay means is needed, and the allowance for 30 T is 0.5 T. The allowance of 0.5 T is ensured as a margin by matching the sector mark patterns at a period twice that of the normal recording clock, as described above. Therefore, if the frequency error exceeds 1.67% (0.5 T/30 T), the SM may not be accurately detected.

In this case, the response time of the synthesizer poses a problem. Normally, the synthesizer needs a time of several msec to output a stable clock frequency after reception of a frequency switching command. That is, if the zone changes, the SM cannot be detected for several msec until the clock frequency of the synthesizer is switched, and the address of the sector cannot be read. For this reason, particularly when a sector near a zone boundary is to be accessed, the sector mark can hardly be detected and data cannot be reproduced until the clock frequency of the synthesizer is stabilized.

In the information reproducing apparatus in FIG. 5, the clock frequency of the synthesizer is switched in accordance with a command of the controller. When a seek operation of the reproducing head is to be performed, the controller compares the current address on the recording disk with the target address, and switches the clock frequency of the synthesizer on demand to detect the SM or address during the seek operation. If the seek operation is normally completed, there is no problem. However, if an address different from the target address is accessed due to some trouble, the address cannot be read because the frequency of the reproduction signal is largely different from the clock frequency of the synthesizer. For this reason, the seek operation may fail.

In this case, to read the address, a method is conceivable in which the frequency of the synthesizer is sequentially switched to obtain a clock frequency capable of reproducing the address. By reading the address at the obtained frequency, the current position is recognized, and the target address can be accessed again on the basis of the recognition result. However, in this method, to sequentially switch the frequency of the synthesizer to obtain a frequency capable of reproducing the address, an operation of switching the clock frequency and an operation of reading the address at the switched frequency must be repeated. Therefore, a long time is required to search for a correct clock frequency.

SUMMARY OF THE INVENTION

The present invention has been made in consideration of the above problems, and has as its object to provide a synchronizing mark detecting apparatus capable of accurately detecting a synchronizing pattern even when the frequency error of a clock signal is large.

It is another object of the present invention to provide an information reproducing apparatus which uses the synchronizing mark detecting apparatus to detect a synchronizing mark in an adjacent zone even when a frequency error occurs during the switching operation of the clock frequency, thereby smoothly performing the seek and reproducing operations near a zone boundary.

It is still another object of the present invention to provide an information reproducing apparatus which switches the clock frequency when a seek operation of a reproducing head results in the head being located at an erroneous position, thereby immediately reading an address at the position.

According to the present invention, there is provided a synchronizing mark detecting apparatus comprising pattern matching means for sampling binary data of synchronizing mark patterns with an asynchronous clock to determine whether mark and space lengths match with predetermined patterns, pulse generating means for generating a pulse signal having a predetermined width when the pattern matching means determines successful pattern matching, delay means for delaying signals output from the pulse generating means to substantially match the timings of the signals with each other, and determination means for synthesizing output signals from the delay means to determine the degree of matching of the synchronizing mark patterns from a synthesis result.

The pattern matching means may have a shift register for shifting the binary data of the synchronizing mark pattern with the asynchronous clock. The shift register may have a predetermined number of idle terminals for allowing in a frequency error of the asynchronous clock.

The pulse generating means may broaden the pulse width of the pulse signal to allow in a frequency error of the asynchronous clock as the delay amount produced by the delay means increases.

According to the present invention, there is also provided a synchronizing mark detecting method comprising the steps of sampling binary data of synchronizing mark patterns with an asynchronous clock to determine whether mark and space lengths match with predetermined patterns, generating a pulse signal having a predetermined width when it is determined that the mark and space lengths match the predetermined patterns, delaying the generated pulse signals to substantially the match timings of the signals with each other, and synthesizing the delayed signals to determine the degree of matching of the synchronizing mark patterns from a synthesis result.

According to the present invention, there is also provided an information reproducing apparatus comprising clock generating means for generating reference clocks having different frequencies in correspondence with a plurality of transmission frequencies, synchronizing mark detection means for detecting a synchronizing mark in a transmission signal from the reference clock, determination means for determining a reproduction position of the transmission signal on the basis of the detected synchronizing mark, interval detection means for counting the reference clocks to detect an interval between synchronizing mark detection signals detected by the synchronizing mark detection means, and means for determining whether the interval detected by the interval detection means is within a predetermined range and for changing the frequency of the reference clock generated by the clock generating means on the basis of a determination result.

According to the present invention, there is also provided an information reproducing method comprising the steps of generating reference clocks having different frequencies in correspondence with a plurality of transmission frequencies, detecting a synchronizing mark in a transmission signal from the reference clock, determining a reproduction position of the transmission signal on the basis of the detected synchronizing mark, counting the reference clocks to detect an interval between synchronizing mark detection signals detected by the synchronizing mark detection means, and determining whether the detected interval is within a predetermined range and changing the frequency of the reference clock generated by the clock generating means on the basis of a determination result.

BRIEF DESCRIPTION OF THE DRAWINGS

FIG. 3 is a circuit diagram showing a sector mark detection circuit in the technical report of the ISO standards;

FIGS. 4A–4H charts for explaining a sector mark detection operation by the sector mark detection circuit in FIG. 3;

FIGS. 15A to 15C are timing charts each showing a signal from a portion of the circuit shown in FIG. 14.

DETAILED DESCRIPTION OF THE PREFERRED EMBODIMENTS

Figure 1:
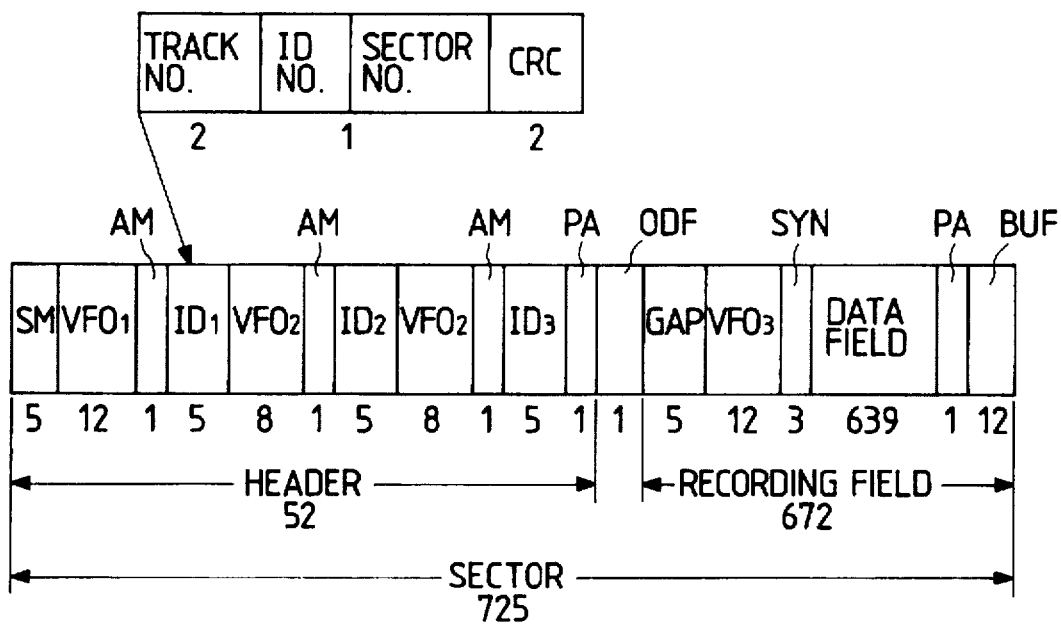
FIG. 1 is a view showing the sector format of a rewritable optical disk complying with the ISO standards.
Figure 2:
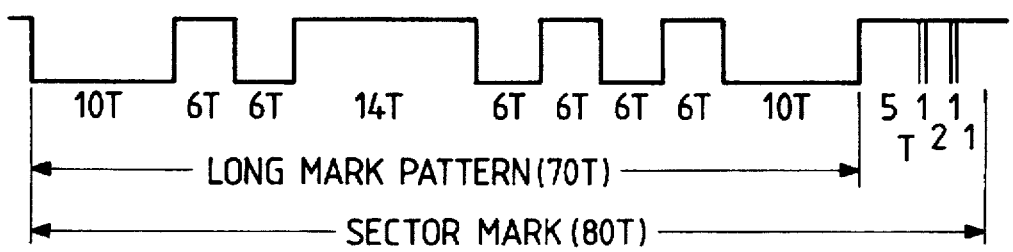
FIG. 2 is a view showing a sector mark pattern in FIG. 1.
Figure 5:
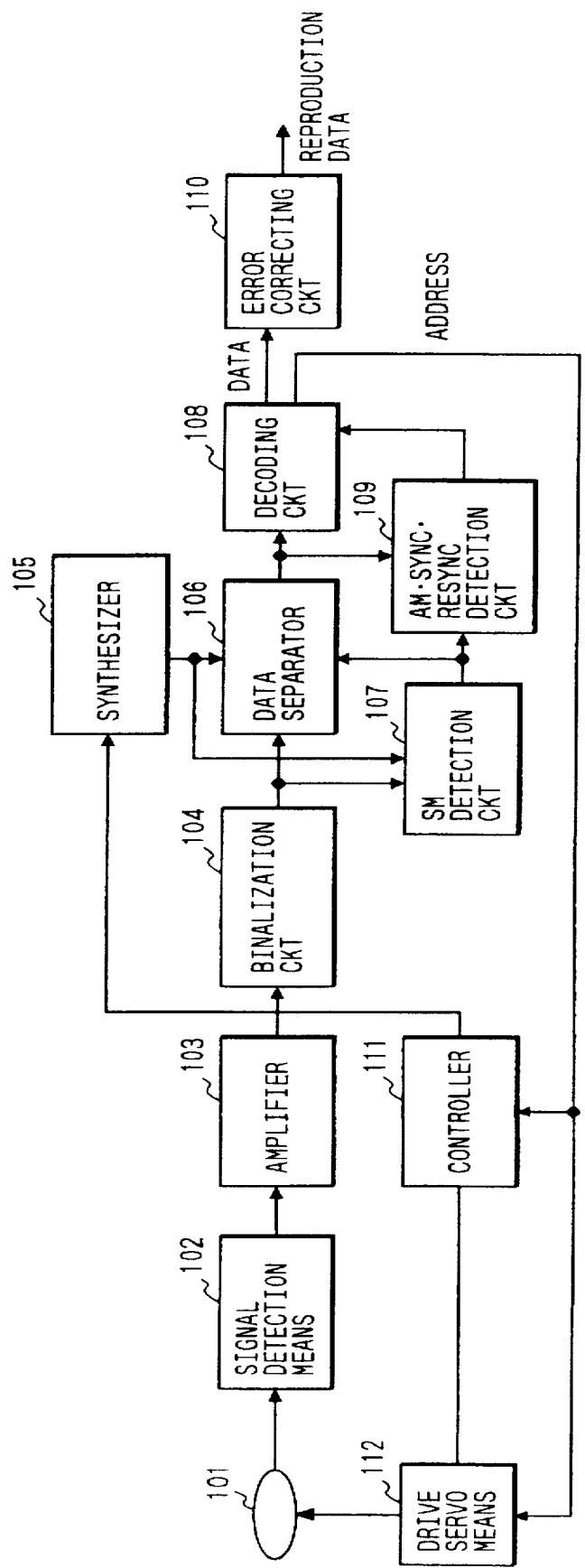
FIG. 5 is a block diagram showing a general information reproducing apparatus using the ZCAV method.
Figure 6:
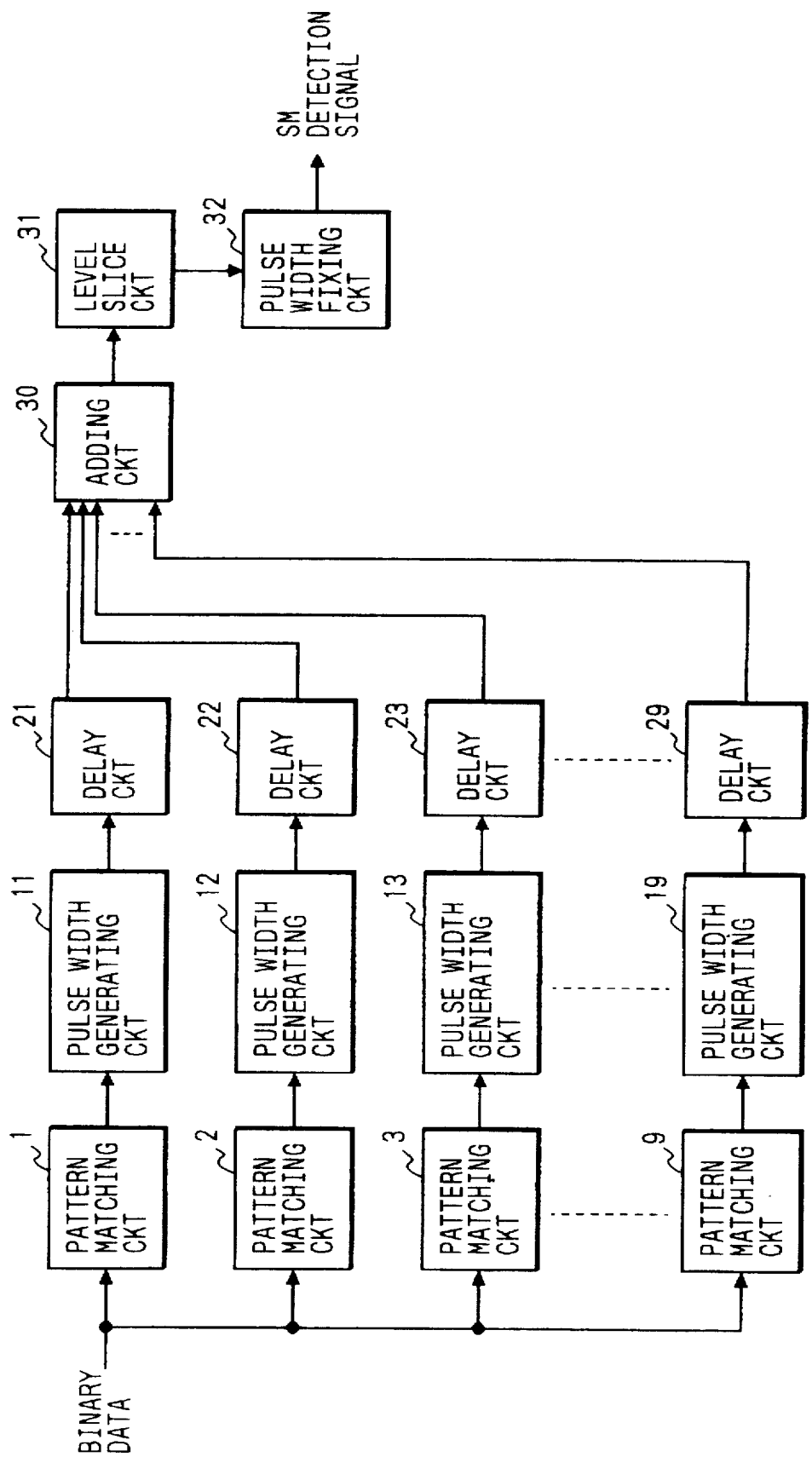
FIG. 6 is a block diagram showing an embodiment of a synchronizing mark detecting apparatus of the present invention.

An embodiment of the present invention will be described below in detail with reference to the accompanying drawings. FIG. 6 is a block diagram showing an embodiment of a synchronizing mark detecting apparatus of the present invention. Referring to FIG. 6, pattern matching circuits 1 to 9 respectively match sector mark patterns. In this apparatus, the nine pattern matching circuits are provided in correspondence with the sector mark patterns shown in FIG. 2. Binary data is output from a binarization circuit 104 of an information reproducing apparatus shown in FIG. 5. Pulse width generating circuits 11 to 19 respectively generate pulse signals having predetermined widths from output signals from the corresponding pattern matching circuits. Delay circuits 21 to 29 respectively delay the pulse signals generated by the corresponding pulse width generating circuits 11 to 19 to synchronize their timings. An adding circuit 30 adds output signals from the delay circuits. A level slice circuit 31 slices an output signal from the adding circuit 30 at a predetermined slice level. A pulse width fixing circuit 32 shapes an output signal from the level slice circuit 31 into a pulse signal having a predetermined width. An output signal from the pulse width fixing circuit 32 is output as an SM detection signal.

Figure 7:
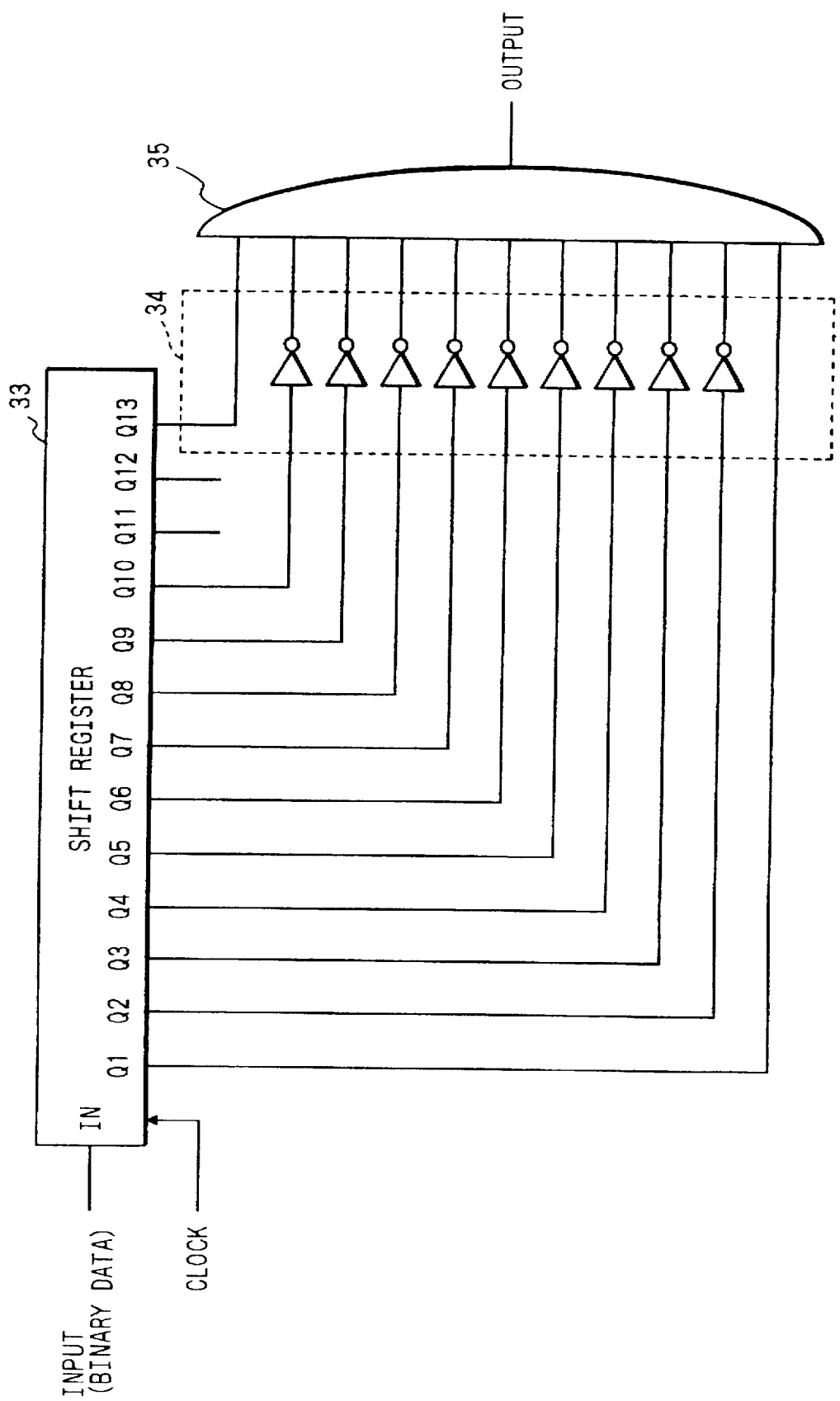
FIG. 7 is a circuit diagram showing the detailed arrangement of a pattern matching circuit 1 in the embodiment in FIG. 6.

FIG. 7 is a circuit diagram showing the detailed arrangement of the pattern matching circuit 1. The pattern matching circuit 1 performs pattern matching of the 10 T mark at the start of the sector mark and is constituted by a shift register 33, inverters 34, and an AND gate 35. Binary data from the binarization circuit 104 shown in FIG. 5 is input to the shift register 33 and shifted by the clocks from the synthesizer 105. The shift register 33 has thirteen output terminals Q1 to Q13. Output signals from the output terminals Q1 and Q13 at the two ends are directly output to the AND gate 35, and output signals from the remaining terminals Q2 to Q10 are output to the AND gate 35 through the inverters 34. The output terminals Q11 and are Q12 are idle terminals and provided to allow for a frequency error of the clock of the synthesizer 105, as described later. In the pattern matching circuit 1 having the above arrangement, when the binary data of the 10 T mark is input, a high-level signal representing successful pattern matching is output from the AND gate 35. As for the binary data, a "0" portion represents a mark portion, and a "1" portion represents a space portion. The clock of the shift register 33 is generated by the synthesizer 105, so this signal serving as a sampling clock has not only a phase error but also a frequency error.

The pattern matching circuit 2 performs pattern matching of the 6 T space next to the 10 T mark, as will be described later, and uses a shift register having nine output terminals in accordance with the space length. That is, the pattern matching circuit 2 performs pattern matching of a space. For this reason, in contrast with FIG. 7, output signals from the output terminals at the two ends of the shift register are output to an AND gate through inverters, and output signals from the remaining output terminals are directly output to the AND gate. Two bits of the shift register are idle terminals, as a matter of course. Also in the pattern matching circuits 3 to 9, the number of bits of a shift register is determined in accordance with the mark or space length of a pattern subjected to matching. The positions of inverters between the output terminals of the shift register and the AND gate are determined in accordance with the target pattern as a mark or space. More specifically, when the target pattern is a mark, output signals from the output terminals except for those at the two ends of the shift register are output through the inverters, as shown in FIG. 7. When the target pattern is a space, in contrast with FIG. 7, only output signals from the output terminals at the two ends of the shift register are output to the AND gate through the corresponding inverters. In all of the pattern matching circuits, two bits of the shift register are idle terminals to allow for a clock frequency error.

The detailed operation of the above embodiment will be described below with reference to FIGS. 8A–8M. Referring to FIGS. 8A–8M, the binary data is obtained by reproducing the sector mark patterns shown in FIG. 2 by a signal detection means 102 of the information reproducing apparatus in FIG. 5 and binarizing the reproduction data by the binarization circuit 104. As described above, a "0" portion of the binary data represents a mark, and a "1" portion represents a space. When the binary data is input, the pattern matching circuit 1 performs pattern matching of the 10 T mark at the start of the sector mark. More specifically, the binary data of the 10 T mark is represented by "1xx0000000001", as shown in FIGS. 8A–8M. When this binary data is input to the pattern matching circuit 1 in FIG. 6, the AND gate 35 outputs a high-level signal representing the matching of the binary data with the 10 T mark length of the sector mark.

That is, the shift register 33 shifts the binary data in response to the sampling clock of the synthesizer 105 and outputs a signal through the inverters 34 and the AND gate 35, thereby detecting the 10 T mark pattern represented by "1xx000000001", as shown in FIGS. 8A–8M. In this case, each x corresponds to an idle terminal of the shift register 33 and can represent either of bits of "0" and "1". Because of these bits, even when the sampling clock of the synthesizer 105 has a frequency error, the 10 T mark can be detected. The 10 T mark can certainly be detected within an error range of ±1 T with respect to 10 T. Therefore, the allowable clock frequency error is ¹⁄₁₀=10%.

The pattern matching circuit 2 performs pattern matching of the 6 T space next to the 10 T mark. The binary data of the 6 T space is represented by "0xx111110", as shown in FIGS. 8A–8M. When this binary data is input to the pattern matching circuit 2, a high-level signal representing successful pattern matching is output. Also in this case, since xx bits are provided, the 6 T space pattern can be detected within an error range of 6 T±1 T.

The pattern matching circuit 3 performs pattern matching of the 6 T mark next to the 6 T space, as shown in FIGS. 8A–8M. Similarly, the pattern matching circuits 4 to 9 perform pattern matching of the 14 T space, the 6 T mark, the 6 T space, the 6 T mark, the 6 T-space, and the 10 T mark, respectively. In each pattern matching circuit, as shown in FIGS. 8A–8M, by receiving the binary data in response to the sampling clock, pattern matching of the mark or space length of the sector mark pattern is performed.

An output signal from the pattern matching circuit 1 is output to the pulse width generating circuit 11 and shaped into a pulse signal having a predetermined width. In this case, an output signal from the pulse width generating circuit 11 is delayed by the delay circuit 12, as described later, and added to signals from the remaining pattern matching circuits. As the delay length becomes longer, the phase error with respect to the delay amount becomes larger. When all the signals are added, a time lag is likely to occur. For this reason, it is preferable to increase the pulse width more as the delay amount increases. In this case, as shown in FIGS. 8A–8M, the pulse width generating circuit 11 generates a pulse signal having a width of 5 T.

Output signals from the pattern matching circuits 2 to 9 are output to the corresponding pulse width generating circuits 12 to 19, respectively, and pulse signals having predetermined widths are generated. In this embodiment, as shown in FIGS. 8A–8M, each of the pulse width generating circuits 12 to 14 generates a pulse signal having a width of 5 T as in the pulse width generating circuit 5 T because the delay amounts are large in these circuits. Since the delay amounts are relatively small in the pulse width generating circuits 15 to 18, each of these circuits generates a pulse signal having a width of 3 T. An output signal from the pulse width generating circuit 19 need not be delayed, so a pulse signal having a minimum width of 1T is generated, as shown in FIGS. 8A–8M. In FIG. 6, the delay circuit 29 for delaying an output signal from the pulse width generating circuit 19 is provided, but its delay amount is zero.

The pulse signals from the pulse width generating circuits 11 to 19 are input to the corresponding delay circuits 21 to 29 and delayed such that the timings of these pulse signals match each other, as shown in FIGS. 8A–8M. Nine output signals from the delay circuits 21 to 29 are input to the adding circuit 30, and the nine output signals are added, as shown in FIGS. 8A–8M When the nine pulse signals having different widths are added, and there is no clock frequency error, the adding circuit 30 outputs a signal having a peak at the center, as shown in FIGS. 8A–8M.

The output signal from the adding circuit 30 is sent to the level slice circuit 31 and sliced at a predetermined level, as shown in FIGS. 8A–8M. In this embodiment, the slice level is set to an intermediate level between the total level of six outputs from the adding circuit 30 and the total level of five outputs from the adding circuit 30 (one output corresponds to one output from the pulse width generating circuit). By slicing the signal with this slice level, a pulse signal having a width of 3 T can be obtained, as shown in FIGS. 8A–8M. Therefore, when six patterns or more of the nine marks and spaces of the sector mark pattern are detected, the sector mark can be detected. An output signal from the level slice circuit 31 is shaped into a pulse signal having a predetermined width with reference to a leading edge by the pulse width fixing circuit 32, as shown in FIGS. 8A–8M, and output as the SM detection signal.

In this embodiment, the pulse signal (5 T) generated by the pulse width generating circuit 11 has a width larger than a normal width of 1 T by ±2 T. For this reason, an error of ±2 T with respect to the delay amount of 60 T of the delay circuit 21, i.e., a clock frequency error of about 3.3% can be allowed. Similarly, since the pulse signal (3 T) generated by the pulse width generating circuit 15 has a width larger than a normal width by ±1 T, an error of ±1 T with respect to the delay amount of 28T of the delay circuit 25, i.e., a clock frequency error of about 3.5% can be allowed. As for the remaining pulse signals, a larger frequency error can be allowed. In this embodiment, a frequency error of 3.3% can be allowed as a whole. When the frequency error is close to 3.3%, the waveform of the level-sliced output is laterally distorted to shift the SM detection signal by 1 T to 2 T. In the information reproducing apparatus, however, a detection error of 4 to 5 channel clocks is allowed for the SM detection signal, so no problem is posed.

Figure 8:
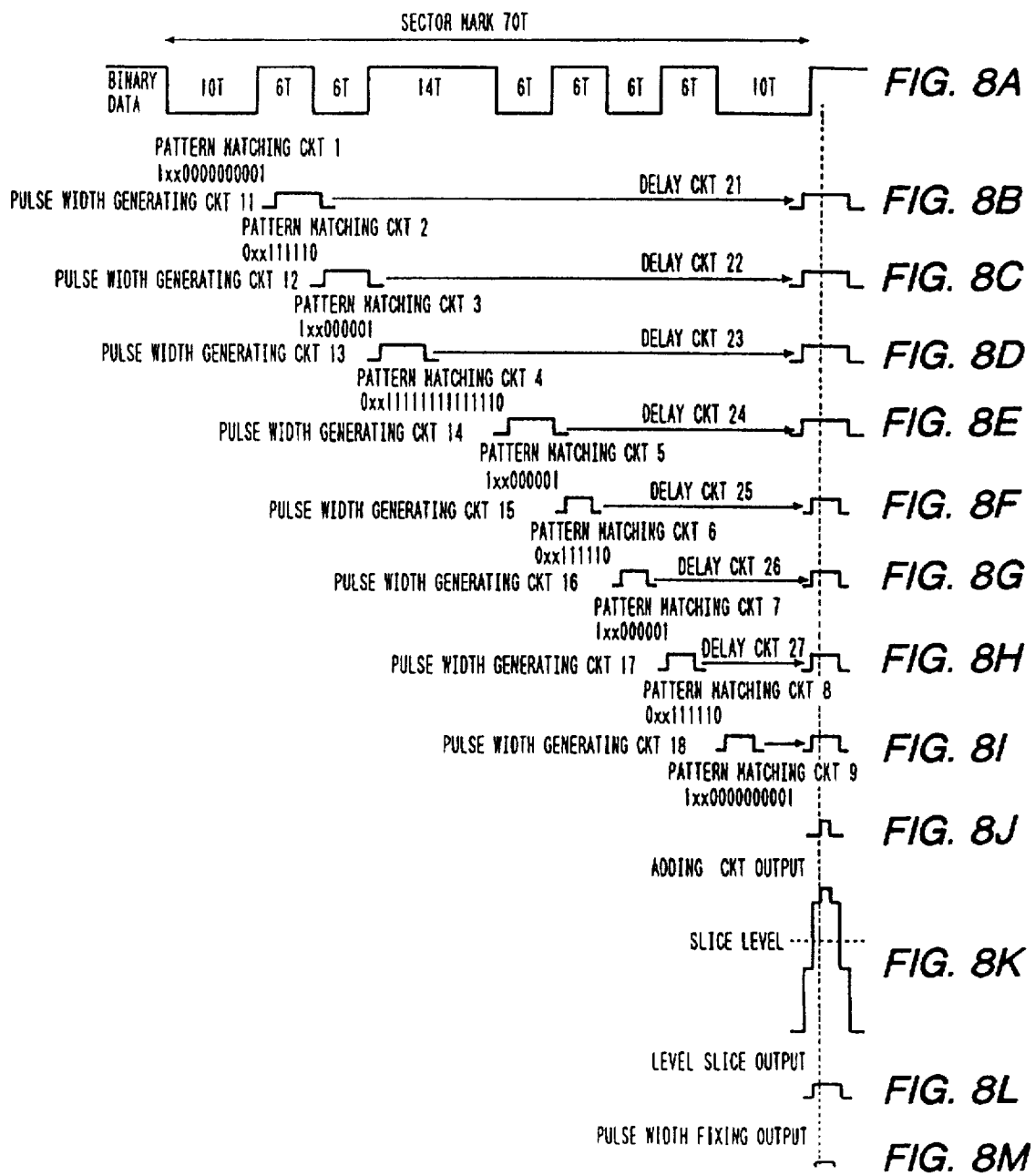
FIGS. 8A–8M are timing charts showing the operation of the embodiment in FIG. 6.
Figure 9:
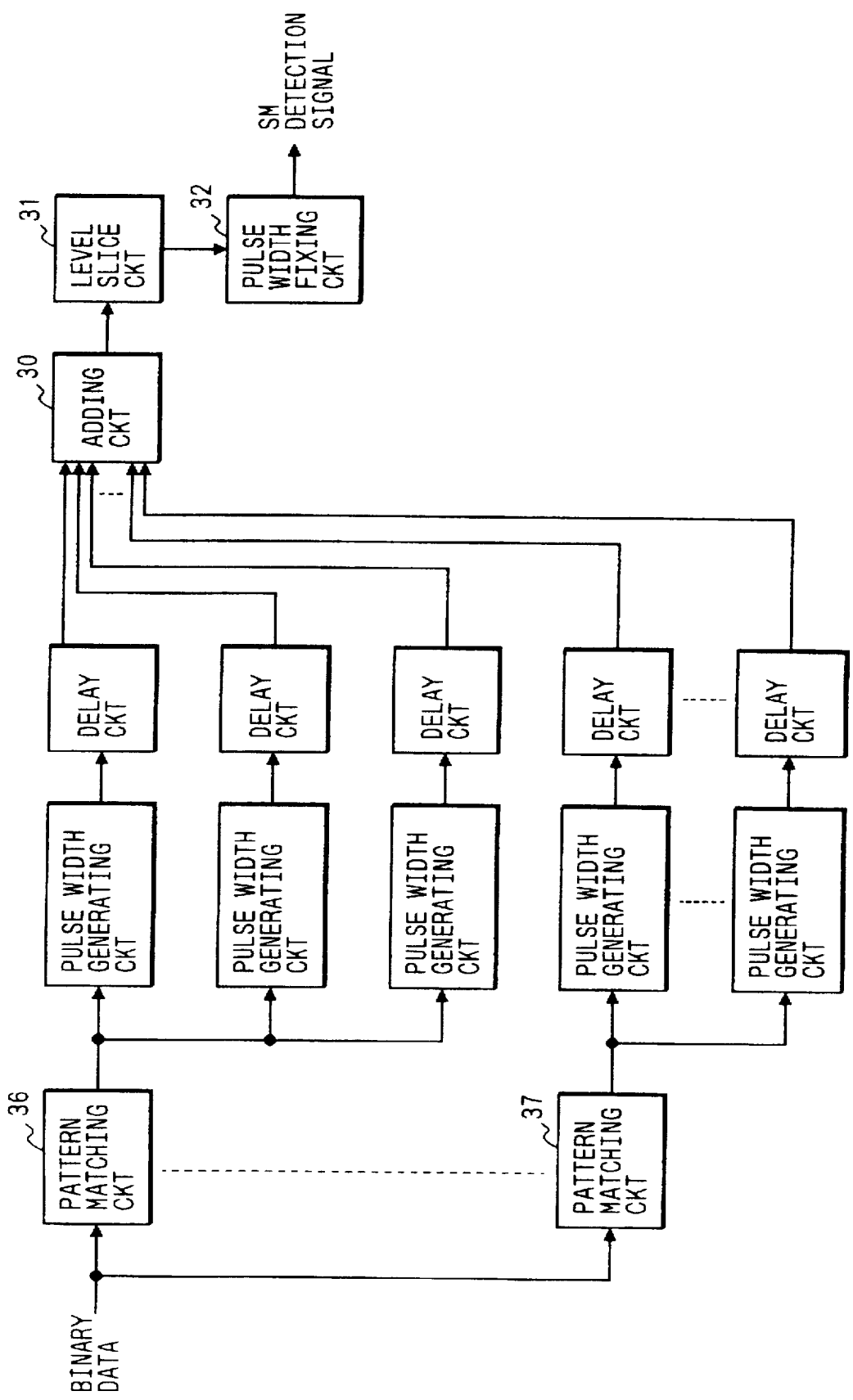
FIG. 9 is a block diagram showing another embodiment of the synchronizing mark detecting apparatus of the present invention.

FIG. 9 is a block diagram showing another embodiment of the synchronizing mark detecting apparatus of the present invention. In this embodiment, since the sector mark patterns include two 10 T marks, three 6 T marks, and three 6 T spaces, as shown in FIG. 8, the pattern matching circuits are commonly used for these common portions. Therefore, in this embodiment, three pattern matching circuits which correspond to the 10 T marks, the 6 T marks, and the 6 T spaces, respectively, and one pattern matching circuit corresponding to the 14 T space can be sufficient, so that the circuit arrangement can be largely simplified.

Referring to FIG. 9, a pattern matching circuit 36 is used to perform pattern matching of the 6 T spaces, and a pattern matching circuit 37 is used to perform pattern matching of the 6 T marks. Pattern matching circuits (not shown) for performing pattern matching of the 10 T marks and the 14 T space are also provided. The other arrangement is the same as that in FIG. 6.

Figure 10:
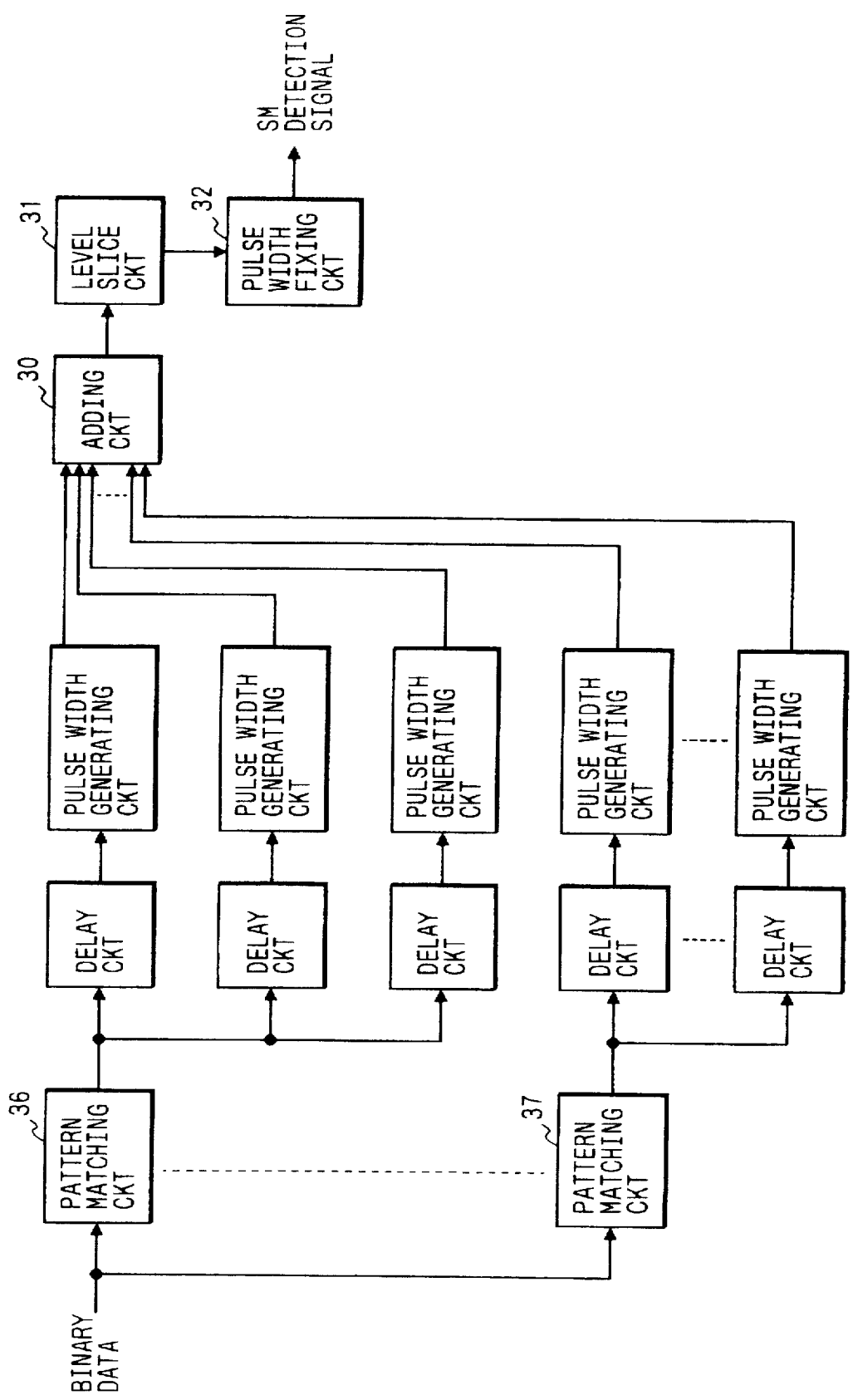
FIG. 10 is a block diagram showing still another embodiment of the synchronizing mark detecting apparatus of the present invention.

FIG. 10 is a block diagram showing still another embodiment of the synchronizing mark detecting apparatus of the present invention. In this embodiment, the positions of pulse width generating circuits are replaced with those of delay circuits, and the delay circuits are provided before the pulse width generating circuits. In FIG. 6, for descriptive convenience, the pulse width generating circuits are provided before the delay circuits. However, as in this embodiment, when the delay circuits are provided before the pulse width generating circuits, a counter can be used as the delay circuit to simplify the circuit arrangement.

As described above, in the synchronizing mark detecting apparatus of the present invention, pattern matching is performed for both marks and spaces. Therefore, pattern matching can be performed with a high accuracy.

An embodiment of an information reproducing apparatus of the present invention will be described below. An embodiment will be described in which the synchronizing mark detecting apparatus described in the above embodiments is used. Therefore, the information reproducing apparatus has the same arrangement as that in FIG. 5 and uses the synchronizing mark detecting apparatus in FIGS. 6, 9, or 10 as an SM detection circuit 107.

In this embodiment, the synchronizing mark detecting apparatus of the present invention is used in the ZCAV information reproducing apparatus. Conventionally, when the read position of a reproducing head shifts to another zone, a certain period of time is needed to switch the clock frequency of a synthesizer 105 and obtain a stable clock frequency. However, in this embodiment, the allowable clock frequency error is very large as compared to the prior art. For this reason, the sector mark of an adjacent zone can be detected even during the switching operation of the clock frequency. When the sector mark is detected, an address can also be read out. Therefore, the seek and reproducing operations near a zone boundary can be smoothly performed without requiring an unnecessarily long time.

The above embodiment has exemplifies detection of a sector mark as a synchronizing mark. However, for example, an address mark, a data mark, a sync pattern, a resync pattern, or the like can also be detected, as a matter of course. Not only the synchronizing mark pattern of the information reproducing apparatus but also a synchronizing mark pattern in a communication signal can be detected.

In addition, in the above embodiments, mark or space lengths are measured at a plurality of positions. However, in the mark position recording method, synchronizing patterns can be detected by measuring mark intervals at a plurality of positions. The present invention can also be applied to an apparatus except for the optical information reproducing apparatus, e.g., a magnetic recording apparatus for which the terms of "mark" and "space" are inappropriate because information is recorded/reproduced by physically alternately arranging two stable states. The present invention can also be applied to multivalued recording except for binary recording, i.e., ternary recording or more by detecting the length of each state.

In the pattern matching circuit in FIG. 7, for example, when matching of the 10 T mark is to be performed, pattern matching is successful when the binary data is "1xx0000000001". However, the pattern can also be "1000000000xx1" or "1x000000000x1". This also applies to the remaining pattern matching circuits. This can be realized by changing the positions of the idle terminals of the shift register of the pattern matching circuit in FIG. 7.

Figure 11:
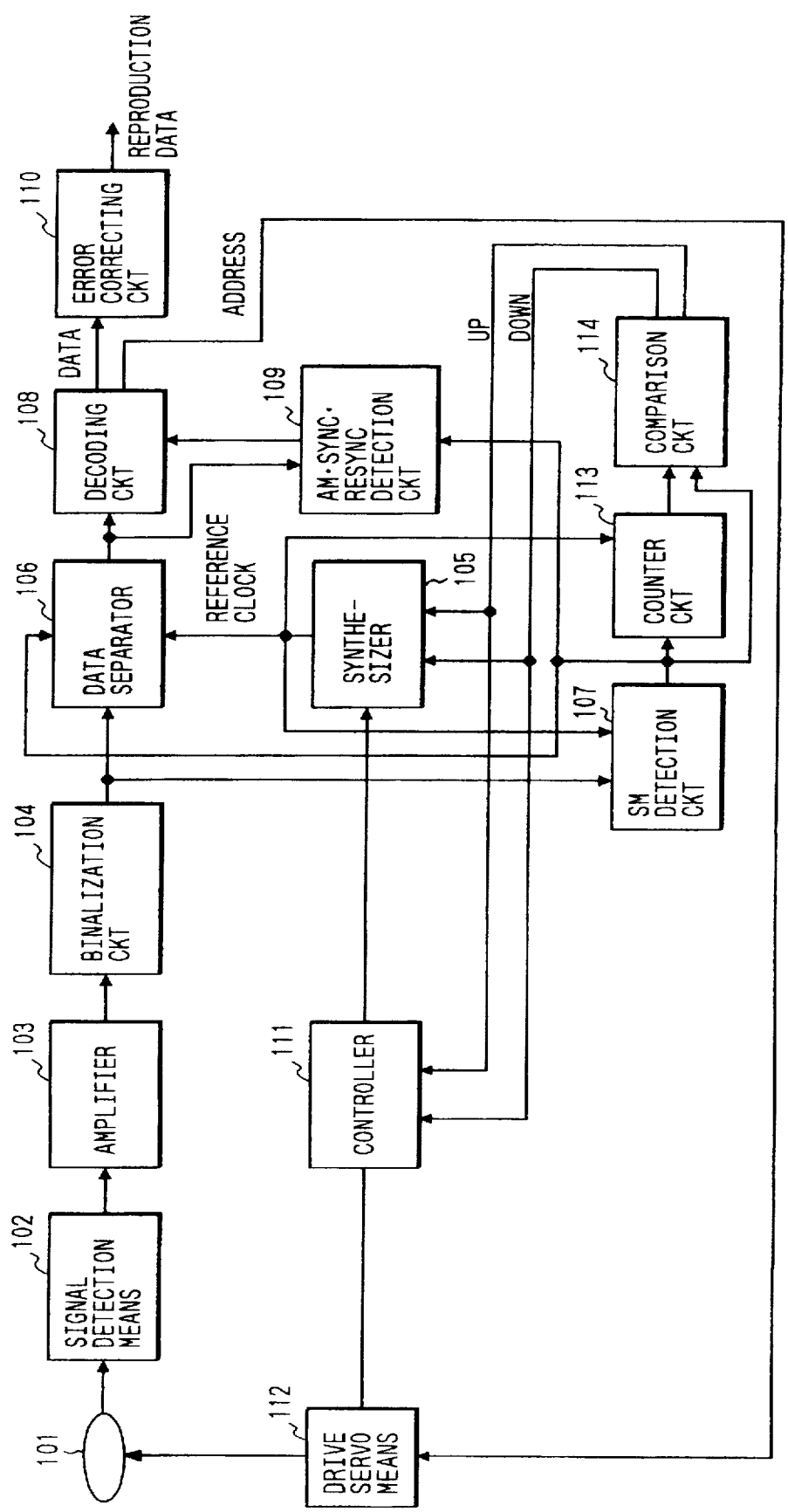
FIG. 11 is a block diagram showing an embodiment of an information reproducing apparatus of the present invention.

FIG. 11 is a block diagram showing another embodiment of the information reproducing apparatus of the present invention. The same reference numerals as in the conventional apparatus shown in FIG. 5 denote the same portions in FIG. 11, and a detailed description thereof will be omitted. Referring to FIG. 11, a counter circuit 113 measures the interval between SM detection signals from an SM detection circuit 107 using the reference clock of a synthesizer 105. A comparison circuit 114 compares the measurement value of the interval between the SM detection signals, which is measured by the counter circuit 113, with a predetermined reference range to determine whether the measurement value falls within the reference range. Predetermined ranges are defined on the upper and lower sides of the normal detection position of a sector mark. If the measurement value of the interval between the SM detection signals falls within the lower reference range, the comparison circuit 114 outputs an UP signal. If the measurement value falls within the upper reference range, a DOWN signal is output. The clock frequency of the synthesizer 105 is controlled in accordance with the UP/DOWN signal.

Figure 12:
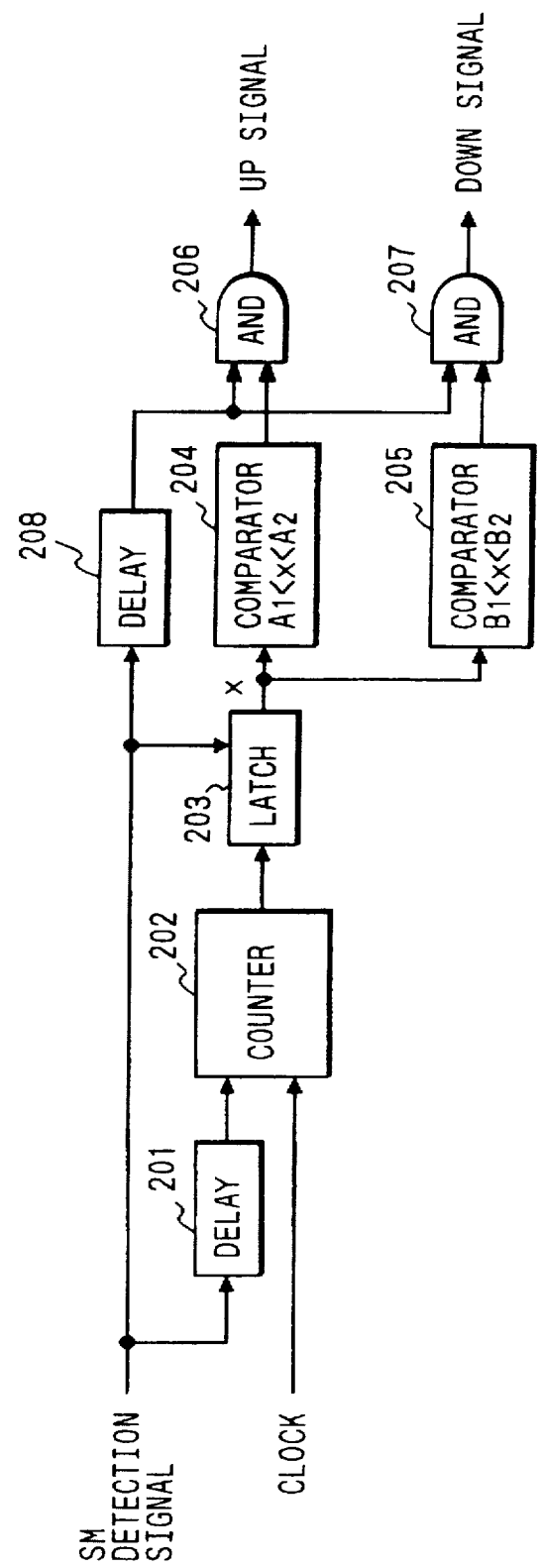
FIG. 12 is a circuit diagram showing a detailed example of a counter circuit and a comparison circuit in the embodiment shown in FIG. 11.

FIG. 12 is a block diagram showing the detailed arrangement of the counter circuit 113 and the comparison circuit 114. A delay 201 delays the SM detection signal by a predetermined period of time. A counter 202 is reset with the SM detection signal input through the delay 201 to count the clocks from 0 until the next SM detection signal is input. That is, the counter 202 is used to measure the interval between the SM detection signals. A latch 203 receives and holds a count value x from the counter 202 when the next SM detection signal is input to the counter 202. The delay 201 is used to set the reset timing of the counter 202 after the timing of the latch 203.

A comparator 204 determines whether the count value x held by the latch 203 falls within a predetermined reference range (range from $A_1$ to $A_2$). A comparator 205 also determines whether the count value x falls within a reference range (range from $B_1$ to $B_2$). The reference ranges from $A_1$ to $A_2$ and from $B_1$ to $B_2$ will be described later in detail. AND circuits 206 and 207 respectively AND output signals from the comparators 204 and 205 and an output signal from a delay 208. The delay 208 synchronizes the output signals from the comparators 204 and 205 with the SM detection signal. The comparator 204 outputs a signal of level "1" when the measurement value x falls within the reference range from $A_1$ to $A_2$. At this time, the AND circuit 206 ANDs the output signal from the comparator 204 and an output signal from the delay 208 to output a signal of level "1 ". Therefore, this signal is output as an UP signal. The comparator 205 also outputs a signal of level "1" when the measurement value x falls within the range from $B_1$ to $B_2$. At this time, the AND circuit 207 ANDs the output signal from the comparator 205 and an output signal from the delay 208 to output a signal of level "1 ". This signal is output as a DOWN signal.

Figure 13:
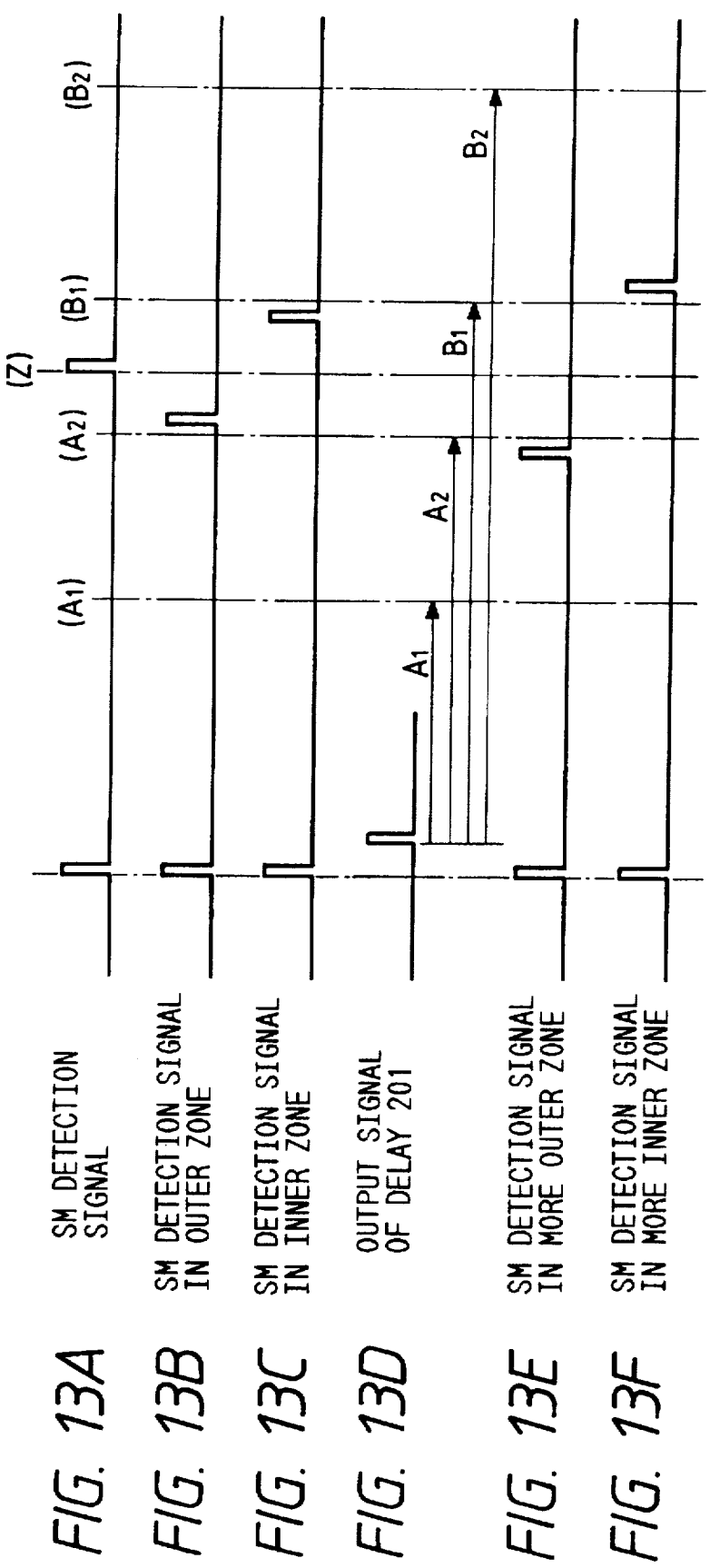
FIGS. 13A to 13F are timing charts showing signals in the circuit shown in FIG. 12.

The operations of the counter circuit 113 and the comparison circuit 114 shown in FIG. 12 will be described below with reference to FIGS. 13A to 13F. FIG. 13A is a timing chart of the SM detection signal in the normal operative state of the apparatus. The sector mark is normally detected at a period shown in FIG. 3A. FIG. 13B is a timing chart of the SM detection signal for, when the SM detection signal in a predetermined zone of a recording disk having the ZCAV format is as shown FIG. 3A, detecting a sector mark in an outer zone adjacent to the predetermined zone. In the outer zone, the SM signal has a short period, as shown in FIG. 13B, and the detection position is shifted to the left side of a normal detection position Z in FIG. 13A. If the clock frequency of the adjacent zone is higher by 2%, the period of the SM detection signal in FIG. 13B becomes shorter than that in FIG. 13A by 2%. When the period of this SM detection signal is counted with the same reference clocks, the count value in FIG. 13B becomes smaller than that in FIG. 13A by 2%. That is, the clock frequency of the synthesizer 105 is proportional to the period of the SM detection signal.

FIG. 13C is a timing chart of the SM detection signal in an inner zone adjacent to the zone in FIG. 13A. In this case, the period of the SM detection signal becomes longer than that of the normal SM detection signal, as shown in FIG. 13C. The detection position is shifted to the right side of the detection position Z in the zone in FIG. 13A. FIG. 13D is a timing chart of an output signal from the delay 201. When the sector mark in the predetermined zone is detected by the SM detection circuit 107, as shown in FIG. 13A, and the SM detection signal is output, the SM detection signal is delayed by the delay 201 by a predetermined period of time, as shown in FIG. 13D, and output to the reset terminal of the counter 202.

The counter 202 is reset with this signal, and at the same time, starts to count the reference clocks from the synthesizer 105. This counting operation is continued until the next SM detection signal is output. The count value x of the counter 202 is held by the latch 203. The comparator 204 determines whether the count value x falls within the range from $A_1$ to $A_2$, as shown in FIG. 13D. The comparator 204 outputs a signal of level "1" when the count value x falls within the range from $A_1$ to $A_2$, or a signal of level "0" when the count value x falls outside this range. When the read position of the reproducing head is in a more outer zone than that in FIG. 13B, and the period of the SM detection signal becomes shorter, as shown in FIG. 13E, the measurement count x falls within the range from $A_1$ to $A_2$. Therefore, the comparator 204 outputs a signal of level "1 ". At this time, the AND circuit 206 output an UP signal.

The UP signal from the AND circuit 206 is output to the controller 111 and the synthesizer 105. The clock frequency of the synthesizer 105 is switched in accordance with this UP signal to be higher by one level. More specifically, the clock frequency of the synthesizer 105 is switched stepwise in correspondence with the zone of the recording disk. Since, when the UP signal is output, the read position is located outside the zone of the current frequency, the clock frequency is accordingly controlled to be higher by one level. The controller 111 recognizes that the clock frequency of the synthesizer 105 is raised by one level with the UP signal. The counter 202 is reset with the SM detection signal and starts to count the clock signals until the next SM detection signal is output. The clock frequency at this time is the switched frequency. If the current read position is far from the zone of the current clock, the measurement value x falls within the range from $A_1$ to $A_2$ again. For this reason, an UP signal is output again, and the clock frequency of the synthesizer 105 is controlled to be higher by one more level. In this manner, the clock frequency of the synthesizer 105 is automatically controlled to be closer to the frequency of the zone of the current read position.

The comparator 205 determines whether the measurement value x falls within the range from $B_1$ to $B_2$, as shown in FIG. 13D. If the measurement value x falls within this range, the comparator 205 outputs a signal of level "1". For example, as shown in FIG. 13F, when the read position is in a more inner zone than that in FIG. 13C, and the period of the SM detection signal becomes longer, the measurement value x falls within the range from $B_1$ to $B_2$. At this time, the comparator 205 outputs a signal of level "1", and the AND circuit 207 outputs a DOWN signal. The DOWN signal is similarly output to the controller 111 and the synthesizer 105, and the clock frequency of the synthesizer 105 is controlled to be lower by one level. If the zone of the read position is far from the zone of the current clock frequency, the control operation as described above is repeated to control the clock frequency of the synthesizer 105 to be closer to the frequency of the zone of the current read position.

The positions $A_1$ and $B_2$ shown in FIG. 13D, i.e., the lower and upper limits of the detection range of the SM detection signal are preferably set on the basis of the SM detection ability of the SM detection circuit 107. More specifically, when the positions $A_1$ and $B_2$ are set in accordance with the range of the allowable frequency error of the SM detection circuit 107, an SM detection signal outside the range from $A_1$ to $B_2$ is likely to be one which is not normally detected. For this reason, only SM detection signals within the range from $A_1$ to $B_2$ can be considered as effective signals, and SM detection signals outside this range can be ignored. In addition, the positions $A_2$ and $B_1$ in FIG. 13D are preferably set on the basis of the frequency lock ability of the data separator 106. More specifically, the range from $A_2$ to $B_1$ is set to be narrower than the allowable frequency error range of the data separator 106. If an SM detection signal is present within the range from $A_2$ to $B_1$, the address can be normally reproduced, so the clock frequency need not be switched. The clock frequency can be switched when the SM detection signal falls outside this range.

Normally, in the information reproducing apparatus in FIG. 11, the clock frequency of the synthesizer 105 is controlled by the controller 111, and the data separator 106 synchronizes the binary signal from the binarization circuit 104 with this clock signal. However, as described above, if a seek operation of the reproducing head results in the head not a target track but at an erroneous position due to some reason, the frequency of the reproduction signal at the erroneous position is different from the clock frequency of the synthesizer 105. When the difference exceeds the allowable value, the data separator 106 cannot normally synchronize the binary data with the clock signal. For this reason, the address or data of the recording disk cannot be read.

In this embodiment, the period of the SM detection signal is measured using the clock of the synthesizer 105 operated at the time of the measurement, as described above. It is determined whether the measurement result falls within two predetermined reference ranges, thereby determining whether the zone of the read position is outside or inside the zone of the current clock frequency. The clock frequency of the synthesizer is controlled in accordance with the determination result. With this operation, if a seek operation error occurs, the clock frequency of the synthesizer can be automatically controlled to be closer to the frequency of the zone of the current read position which is obtained by the seek operation error. For this reason, the address at this position can be immediately read. Unlike the prior art, complex control need not be performed to switch the frequency of the synthesizer at random to read the address due to failure of the seek operation. Therefore, a seek operation to the target track can be performed again in a short period of time.

Figure 14:
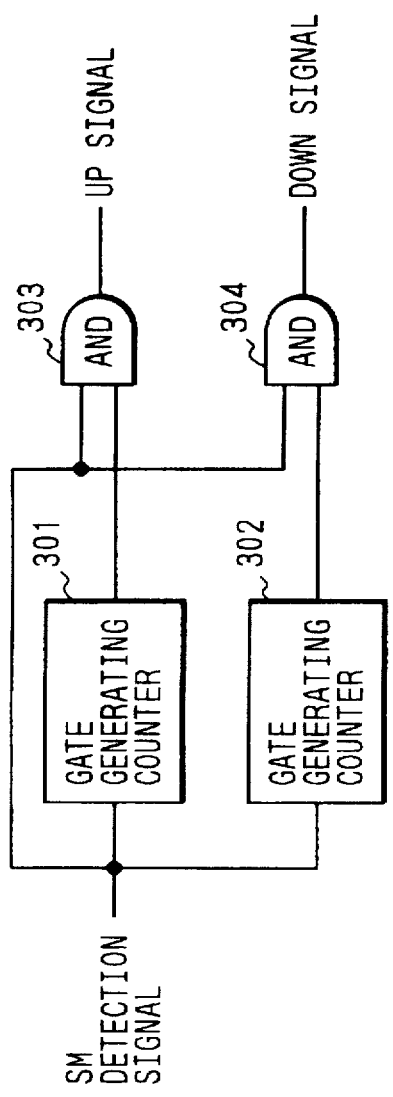
FIG. 14 is a circuit diagram showing another example of the counter circuit and the comparison circuit in the embodiment shown in FIG. 11.

FIG. 14 is a block diagram showing another example of the counter circuit 113 and the comparison circuit 114 shown in FIG. 12. Gate generating counters 301 and 302 respectively generate gate signals which assume a high level during the periods of the above-described reference ranges from $A_1$ to $A_2$ and from $B_1$ to $B_2$. AND circuits 303 and 304 respectively AND the gate signals from the gate generating counters 301 and 302 and the SM detection signal to output an UP or DOWN signal, as in FIG. 12.

Figure 16:
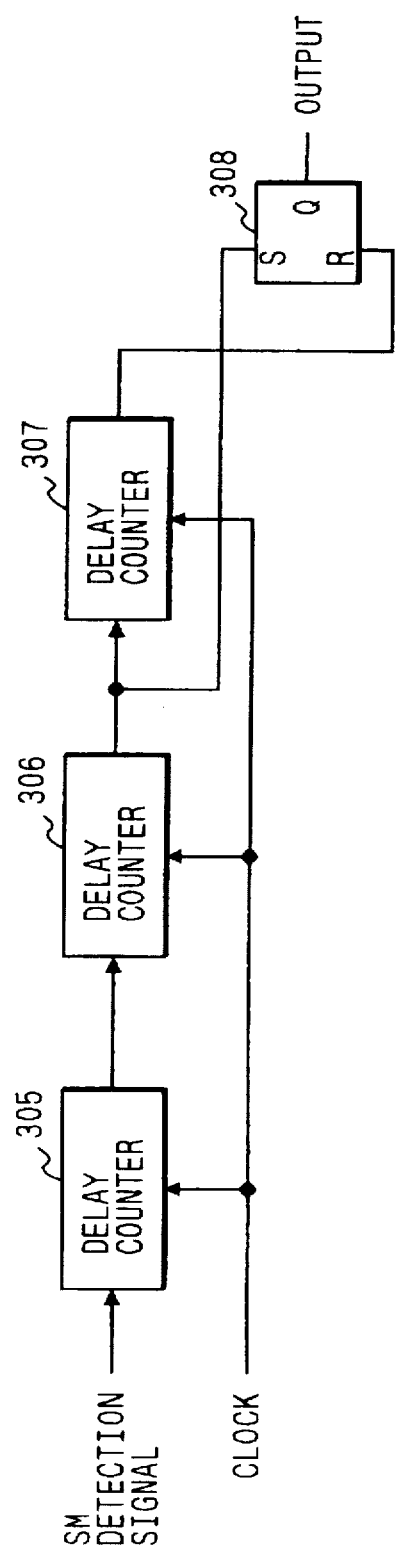
FIG. 16 is a circuit diagram showing the arrangement of a gate generating counter of the circuit shown in FIG. 14.

FIGS. 15A to 15C are timing charts each showing a signal from a portion in FIG. 14. FIG. 15A is a timing chart of the SM detection signal. FIG. 15B is a timing chart of an output signal from the gate generating counter 301. FIG. 15C is a timing chart of an output signal from the gate generating counter 302. The gate generating counter 302 is constituted by, e.g., three delay counters 305 to 307 and one flip-flop 308. The delay counter 305 counts the clocks from the synthesizer 105 starting from the reception timing of the SM detection signal. When the delay counters 306 and 307 count a predetermined number of clocks, a gate signal which assumes a high level during a period from $B_1$, to $B_2$, as shown in FIG. 15C, is generated. The gate generating counter 301 can be constituted by a circuit obtained by removing the delay counter 306 from the circuit in FIG. 16. Similarly, when the two counters count the clocks from the SM detection signal, a gate signal which goes to high level during the period from $A_1$ to $A_2$, as shown in FIG. 15B, is generated.

Also in the above arrangement, when an SM detection signal is output during the period when the output signal from the gate generating counter is at high level, the AND circuit 303 outputs an UP signal. With this UP signal, the clock frequency of the synthesizer 105 can be raised by one level. When an SM detection signal is output during the period when the output signal from the gate generating counter 302 is at high level, a DOWN signal is output, so the clock frequency can be lowered by one level.

In the above embodiments, the ZCAV information reproducing apparatus has been described. However, the present invention is not limited to the ZCAV information reproducing apparatus and can also be applied to, e.g., the CLV or ZCLV information reproducing apparatus as long as it reproduces a plurality of signals at different reproduction frequencies. In the information transmission field, the present invention can also be applied to a signal receiving/ reproducing apparatus for signals which use the same synchronizing signal and sector format, but different transmission frequencies.

In the above embodiments, the clock frequency is raised (lowered) by one level with the UP or DOWN signal. However, the clock frequency can be heightened or lowered by two levels or more.

As has been described above, the present invention provides the following effects.

(1) The clock frequency error margin required for detection of the synchronizing mark can be increased as compared to the prior art. For this reason, even when a clock frequency error occurs to some extent, the synchronizing mark can be accurately detected without degrading the reliability.

(2) In the ZCAV information reproducing apparatus, the recording area of the recording medium is divided into a plurality of zones, and the clock frequency is switched in correspondence with the zone.

In this apparatus, when the clock frequency is switched to the frequency of an adjacent zone at a zone boundary, the synchronizing mark in the adjacent zone can be detected regardless of the frequency error. Therefore, the seek and reproducing operations at a zone boundary can be smoothly performed.

(3) The period of the SM detection signal is measured, and the frequency of the clock signal is increased/decreased on the basis of the measurement result. With this operation, if a seek operation of the reproducing head results in the head being in an erroneous position, the clock frequency can be automatically controlled to be close to the frequency of that zone to read the address. For this reason, even when a seek operation error takes place due to some trouble, the address can be immediately read without causing failure of the seek operation. Therefore, a seek operation to the target address can be performed again.

What is claimed is:

1. A synchronizing mark detecting apparatus comprising:
pattern matching means for sampling binary data of synchronizing mark patterns with an asynchronous clock to determine whether mark and space lengths match with predetermined patterns;
pulse generating means for generating a pulse signal having a predetermined width when said pattern matching means determines successful pattern matching;
delay means for delaying signals output from said pulse generating means to substantially match timings of the signals with each other; and
determination means for synthesizing output signals from said delay means to determine a degree of matching of the synchronizing mark patterns from a synthesis result, wherein said pulse generating means broadens the pulse width of the pulse signal to allow for a frequency error of the asynchronous clock as the delay amount produced by said delay means increases.

2. An apparatus according to claim 1, wherein said pattern matching means has a shift register for shifting the binary data of the synchronizing mark patterns with the asynchronous clock, the shift register having a predetermined number of idle terminals for allowing a frequency error of the asynchronous clock.

3. A synchronizing mark detecting method comprising the steps of:

sampling binary data of synchronizing mark patterns with an asynchronous clock to determine whether mark and space lengths match with predetermined patterns;
generating a pulse signal having a predetermined width when it is determined that the mark and space lengths match with the predetermined patterns;
delaying the generated pulse signals to substantially match timings of the signals with each other; and
synthesizing the delayed signals to determine a degree of matching of the synchronizing mark patterns from a synthesis result, wherein the step of generating the pulse signal includes the step of broadening a pulse width of the pulse signal to allow for a frequency error of the asynchronous clock as the delay amount produced in said delaying step increases.

4. A synchronizing pattern detecting apparatus comprising:
pattern matching means for sampling synchronizing patterns with an asynchronous clock to determine whether the synchronizing patterns match with predetermined patterns;
pulse generating means for generating a plurality of pulse signals having predetermined widths in accordance with the synchronizing patterns when said pattern matching means determines successful pattern matching;
delay means for delaying the plurality of pulse signals output from said pulse generating means to substantially match timings of the pulse signals with each other; and
determination means for synthesizing output signals from said delay means to determine a degree of matching of the synchronizing patterns from a synthesis result;
wherein said pattern matching means has a shift register for shifting the binary data of the synchronizing patterns with the asynchronous clock, and the shift register has a predetermined number of idle terminals for allowing for a frequency error of the asynchronous clock, wherein said pulse generating means broadens the pulse width of the plurality of pulse signals to allow for a frequency error in the asynchronous clock as the delay amount produced by said delay means increases.

5. A synchronizing pattern detecting apparatus comprising:
pattern matching means for sampling synchronizing patterns with an asynchronous clock to determine whether the synchronizing patterns match with predetermined patterns;
pulse generating means for generating a plurality of pulse signals having predetermined widths in accordance with the synchronizing patterns when said pattern matching means determines successful pattern matching;
delay means for delaying the plurality of pulse signals output from said pulse generating means to substantially match timings of the pulse signals with each other; and
determination means for synthesizing output signals from said delay means to determine a degree of matching of the synchronizing patterns from a synthesis result;
wherein said pulse generating means broadens a pulse width of the pulse signal to allow for a frequency error of the asynchronous clock as the delay amount produced by said delay means increases.

6. A synchronizing pattern detecting method comprising the steps of:

sampling synchronizing patterns with an asynchronous clock to determine whether the synchronizing patterns match with predetermined patterns;

generating a plurality of pulse signals having predetermined widths in accordance with the synchronizing patterns when successful pattern matching is determined in the step of determining matching of the synchronizing patterns;

delaying the generated plurality of pulse signals to substantially match timings of the pulse signals with each other;

synthesizing the delayed signals to determine a degree of matching of the synchronizing patterns from a synthesis result;

wherein the step of generating the pulse signal includes the step of broadening a pulse width of the pulse signal to allow for a frequency error of the asynchronous clock as the delay amount produced in the step of delaying the pulse signal increases.

7. An information reproducing apparatus in which a recording area of a recording medium is divided into a plurality of zones, and information is reproduced at a different clock frequency in correspondence with each zone, comprising:

signal detection means for reproducing data on the recording medium;

binarization means for binarizing a signal from said signal detecting means; and synchronizing mark detection means for detecting a synchronizing mark from an output from said binarization means;

wherein said synchronizing mark detection means comprises:

pattern matching means for sampling binary data output from said binarization means with an asynchronous clock to determine whether mark and space lengths match with predetermined patterns;

pulse generating means for generating a pulse signal having a predetermined width when said pattern matching means determines successful pattern matching;

delay means for delaying signals output from said pulse generating means to substantially match timings of the signals with each other; and determination means for synthesizing output signals from said delay means to determine a degree of matching of the synchronizing mark patterns from a synthesis result, wherein said pulse generating means broadens a pulse width of the pulse signal to allow for a frequency error of the asynchronous clock as the delay amount produced by said delay means increases.

8. An information reproducing method in which a recording area of a recording medium is divided into a plurality of zones, and information is reproduced at a different clock frequency in correspondence with each zone, comprising the steps of:

reproducing data on the recording medium;

binarizing the reproduced signal; and detecting a synchronizing mark from the binarized signal;

wherein the step of detecting the synchronizing mark includes the steps of:

sampling the binary data with an asynchronous clock to determine whether mark and space lengths match with predetermined patterns;

generating a pulse signal having a predetermined width when it is determined that the mark and space lengths match with the predetermined patterns;

delaying the generated pulse signals to substantially match timings of the signals with each other; and synthesizing the delayed signals to determine a degree of matching of the synchronizing mark patterns from a synthesis result, wherein the step of generating the pulse signal includes the step of broadening the pulse width of the pulse signal to allow for a frequency error of the asynchronous clock as the delay amount produced in the step of delaying the pulse signal increases.

* * * * *

UNITED STATES PATENT AND TRADEMARK OFFICE
CERTIFICATE OF CORRECTION

PATENT NO. : 5,768,234

DATED : June 16, 1998

INVENTOR(S) : SEIICHIROU SATOMURA

It is certified that error appears in the above-identified patent and that said Letters Patent is hereby corrected as shown below:

COLUMN 3,
Line 62, "in" should read --for--.
Line 65, " in" should read --for--.

COLUMN 4,
Line 52, "charts" should read --are charts--.

COLUMN 5,
Line 57, "and are" should read --and--.
Line 58, "provided" should read --are provided--.

COLUMN 7,
Line 15, "more" should be deleted.
Line 41, "FIGS. 8A-8M" should read --FIGS. 8A-8M.--.

COLUMN 9,
Line 1, "has" should be deleted.

COLUMN 10,
Line 67, "output" should read --outputs--.

UNITED STATES PATENT AND TRADEMARK OFFICE
CERTIFICATE OF CORRECTION

PATENT NO. : 5,768,234
DATED : June 16, 1998
INVENTOR(S) : SEIICHIROU SATOMURA

It is certified that error appears in the above-identified patent and that said Letters Patent is hereby corrected as shown below:

COLUMN 11,
Line 67, "not a target" should read --not being located at a target--.

COLUMN 12,
Line 45, "from $B_1$," should read --from $B_1$--.
Line 50, "goes to" should read --assumes a--.

Signed and Sealed this

Seventh Day of September, 1999

Attest:

Q. TODD DICKINSON

Attesting Officer

Acting Commissioner of Patents and Trademarks